United States Patent
Juan et al.

(10) Patent No.: US 8,942,253 B2
(45) Date of Patent: Jan. 27, 2015

(54) SYSTEM AND METHOD FOR DATA TRANSMISSION ON WIRELESS ALTERNATING SWITCHING CHANNELS

(75) Inventors: Ta-Yang Juan, Changhua (TW);
Tzu-Hsiang Su, Taichung (TW);
Shu-Kang Tseng, Miaoli (TW)

(73) Assignee: Industrial Technology Research Institute, Hsinchu (TW)

( * ) Notice: Subject to any disclaimer, the term of this patent is extended or adjusted under 35 U.S.C. 154(b) by 1142 days.

(21) Appl. No.: 12/755,407

(22) Filed: Apr. 6, 2010

(65) Prior Publication Data

US 2011/0141970 A1    Jun. 16, 2011

(30) Foreign Application Priority Data

Dec. 11, 2009  (TW) .............................. 098142544 A

(51) Int. Cl.
*H04J 3/16* (2006.01)
*H04W 36/06* (2009.01)
*H04W 28/04* (2009.01)
*H04W 48/16* (2009.01)
*H04W 76/02* (2009.01)

(52) U.S. Cl.
CPC .............. *H04W 36/06* (2013.01); *H04W 28/04* (2013.01); *H04W 48/16* (2013.01); *H04W 76/025* (2013.01)

USPC .............................. 370/437; 370/329; 701/24

(58) Field of Classification Search
None
See application file for complete search history.

(56) References Cited

U.S. PATENT DOCUMENTS

| | | | |
|---|---|---|---|
| 2003/0046100 A1* | 3/2003 | Yamauchi | 705/1 |
| 2007/0299571 A1* | 12/2007 | Laberteaux et al. | 701/24 |
| 2008/0232309 A1 | 9/2008 | McNew et al. | |
| 2008/0232433 A1 | 9/2008 | McNew et al. | |

* cited by examiner

*Primary Examiner* — Jackie Zuniga Abad
(74) *Attorney, Agent, or Firm* — Rabin & Berdo, P.C.

(57) ABSTRACT

A system for data transmission on wireless alternating switching channels comprises a user, which allows a user to have at least an additional service on multiple service channels. The user sends at least a service forwarder a request to get at least an additional service, and receives the replied information of a specified forwarding channel. Before the connection between the user and the service forwarder fails or ends, the user receives original service and the service forwarder uses a specified service channel and transmits or receives additional service data for the user in the service channel interval; while in the control channel interval, the service forwarder uses the specified forwarding channel and transmits selective control message and selective additional data for the user, and the user switches to the specified forwarding channel to receive the selective control messages and the selective additional data.

24 Claims, 20 Drawing Sheets

| User A |
|---|
| Control Channel |
| Service Chanel 1 |
| Control Channel |
| Service Chanel 1 |
| Control Channel |
| Service Chanel 1 |
| Control Channel |

| Service Provider/Forwarder B | |
|---|---|
| Control Chanel | Control Channel |
| Service Chanel 2 | Service Chanel 1 |
| Control Channel | Control Channel |
| Service Chanel 2 | Service Chanel 1 |
| Control Channel | Control Channel |
| Service Chanel 2 | Service Chanel 1 |
| Control Channel | Control Channel |

FIG. 7

| User A |
|---|
| Control Chanel |
| Service Chanel 1 |
| Control Chanel |
| Service Chanel 1 |
| Control Chanel |
| Service Chanel 1 |
| Control Chanel |

| Service Provider/Forwarder B | |
|---|---|
| Control Chanel | Control Chanel |
| Service Chanel 2 | Service Chanel 3 |
| Control Chanel | Control Chanel |
| Service Chanel 2 | Service Chanel 3 |
| Control Chanel | Control Chanel |
| Service Chanel 2 | Service Chanel 3 |
| Control Chanel | Control Chanel |

FIG. 11

SYSTEM AND METHOD FOR DATA TRANSMISSION ON WIRELESS ALTERNATING SWITCHING CHANNELS

TECHNICAL FIELD

The disclosure generally relates to a system, apparatus and method for data transmission on wireless alternating switching channels.

BACKGROUND

As the wireless communication technology progresses, various kinds of applications and services are also devised. IEEE 1609 protocol has the characteristics of alternating switching between control channel (CCH) and service channel (SCH), and repeated transmission of WAVE service advertisement (WSA) so as to facilitate the application of the wireless communication in the vehicles. This protocol includes a protocol group, with each part respectively processing different layers of the Open System Interconnection (OSI) model, and in combination with IEEE802.11p physical layer for communication. For example, IEEE 1609.1 is the resource manager, IEEE 1609.2 is to handle the security services of the application and management message, IEEE 1609.3 is to handle the networking services and IEEE 1609.4 is to handle the multi-channel operation.

In IEEE 1609 protocol, the frequency band (5.8 GHz) is divided into 7 groups of channels, as shown in the channel frequency allocation of FIG. 1A, where channel 178 is the control channel and the remaining six channels are service channels. IEEE 1609 protocol specifies a device as a system having at least a single antenna, and divides the time sequence into control interval (CCH interval) and service interval (SCH interval). The bottom layer of IEEE 1609 uses channels of different frequencies simultaneously to transmit difference services, and specifies the single control channel and the multiple service channels to switch alternatingly. All the devices will switch alternatingly and regularly in the control interval and service interval in a synchronous manner at the start of every coordinated universal time (UTC) second, and switch alternatingly the channel frequency of own antenna according to the respective services, as shown in FIG. 1B.

The control interval is for transmitting emergency information, security requirement information, Wireless Access in Vehicular Environments (WAVE) service advertisement (WSA) provided by service providers and WAVE short message protocol (WSMP) of high priority. The service interval is for short message protocol of general priority to exchange information and for service user and service provider to exchange information required for the service. All the supported data formats may use designated Medium Access Control (MAC) for unicast or broadcast.

IEEE 1609 protocol also provides the flexibility of a plurality of service channel accesses. As shown in the four service channel access modes of FIG. 2, the area with slanted pattern is using the control channel and the clear area is using the service channel. Hence, the continuous access mode allows the device to continue the control channel without the channel coordination when no service channel is available. Alternating access mode allows the device to alternatingly use the control channel and the service channel. The immediate access mode allows the device to switch to service channel immediately even when in CCH interval, marked as 231. Extended access mode allows the device to remain in service channel to extend the service channel without switching to control channel after the service interval ends, marked as 232.

Because of the restriction of communication physical layer, a single antenna can only monitor a channel at a time. Hence, the device with a single antenna may only select services provided by a single channel. When the required services are on two or more channels, only one service channel may be selected from the two or more channels to transmit the service and the rest service channels must be given up.

As shown in FIG. 3, U.S. Patent Publication No. 2008/0232309 discloses an adaptive queuing technology for discontinuous channel. In the interval of service channel 310, the technology adjusts the transmission order of data segments transmitted in device service channel transmission queue 320, such as, larger transmission data segment 322 and a plurality of smaller transmission data segments 321, to avoid larger data segment 322 from delay due to channel switching, thereby increasing the utilization of the channel.

U.S. Patent Publication No. 2008/0232433 discloses a short distance communication technology by using an adaptive channel interval to increase or decrease the interval between switches for improving the utilization of the channel. In one embodiment of the technology based on IEEE 1609, the channels are switched for every fixed interval to obtain emergency information and other service information simultaneously. The time to switch channel is adaptively adjusted for different user scenarios, such as, when the need for emergency information is high, the control interval is extended and the next service interval decreases equally.

SUMMARY

The disclosed exemplary embodiments may provide a system, apparatus and method for data transmission on wireless alternating switching channels.

In an exemplary embodiment, the disclosed relates to a system for data transmission on wireless alternating switching channels. The system comprises a user and at least a service forwarder. When the user wants to use at least an additional service apart from the original service, the user sends a request to obtain the additional service and receives the information of a specified forwarding channel responded by the at least a service forwarder. Before the connection between the user and the at least a service forwarder failing or ending, the user receiving at least an original service during service interval, and the at least a service forwarder uses a specified service channel used by the at least an additional service, and transmits or receives the information on the additional service for the user during the service interval. In control interval, the at least a service forwarder extends using the specified forwarding channel to transmit at least a selective control message and selective addition service information to forward to the user. The user switches to the specified forwarding channel to receive the at least a selective control message and the selective additional service information.

In another exemplary embodiment, the disclosed relates to a method for data transmission on wireless alternating switching channels. The method comprises: a user sending a request to obtain an additional service apart from the original service and receiving the information of a specified forwarding channel responded by at least a service forwarder; before the connection between the user and the at least a service forwarder fails or ends, switching alternatingly between at least a service interval and at least a control interval, where during a service interval, the user receiving at least an original service, and the at least a service forwarder using a specified service channel used by the at least an additional service, and transmitting or receiving the information on the additional service for the user; in a control interval, the at least a service forwarder extending using the specified forwarding channel to transmit at least a selective control message and selective addition service information to forward to the user, and the user switching to the specified forwarding channel to receive the t least a selective control message and the selective additional service information.

Yet in another exemplary embodiment, the disclosed relates to an apparatus for data transmission on wireless alternating switching channels. The apparatus comprises at least a service forwarder for forwarding at least an additional service to a user. When the user wants to use at least an additional service apart from the original service, the user sends a request to obtain the additional service and receives the information of a specified forwarding channel responded by the at least a service forwarder. Before the connection between the user and the at least a service forwarder failing or ending, the user receiving at least an original service during a service interval, and the at least a service forwarder uses a specified service channel used by the at least an additional service, and transmits or receives the information on the additional service for the user during the service interval. In a control interval, the at least a service forwarder extends using the specific forwarding channel to transmit at least a selective control message and selective addition service information to forward to the user. The user switches to the specified forwarding channel to receive the at least a selective control message and the selective additional service information.

The foregoing and other features, aspects and advantages of the exemplary embodiments will become better understood from a careful reading of a detailed description provided herein below with appropriate reference to the accompanying drawings.

BRIEF DESCRIPTION OF THE DRAWINGS

FIG. 7 shows an exemplary first working exemplar, describing the initial channel condition of the user and the service provider/forwarder, consistent with certain disclosed embodiments.

FIG. 11 shows an exemplary second working exemplar, describing the initial channel condition of the user and the service provider/forwarder, consistent with certain disclosed embodiments.

DETAILED DESCRIPTION OF THE EXEMPLARY EMBODIMENTS

The exemplary embodiments disclose a technology for data transmission on wireless alternating switching channels so that the devices using services may use additional services on a plurality of service channels to improve the utilization of the channels. The device intends to use additional service must communicate with the device having at least an antenna to inform of the related information of the service to be used, such as, service channel to be used, service to be used, and required WAVE service advertisements (WSA), and so on. The device having at least an antenna receives and filters the useful data in the original service interval and then, in the later control interval, transmits the required service data and required service WSA through the pre-agreed specific forwarding channel to improve channel utilization and increase the types of services the device may use.

Take IEEE 1609 service as example. A device providing IEEE 1609 service will repeatedly send WSA on a control channel accessed by all devices. WSA comprises the provided service list and service the channel information used by each service. The device intends to use the service must monitor the control channel during a specific control interval. After receiving WSA from the service providers, the device compares with the service list intended to use. The service list includes provider service identifier (PSID), channel information, and so on. If the provided service list includes service matching the intended service, the device notifies IEEE 1609 upper layer and starts the actual communication. After the comparison, the device will discard the WSA that does not include the intended services.

Because of the restriction of actual antenna, a single antenna may only receive or transmit data on a single frequency channel at a time. Hence, the number of the channels that a device may use depends on the number of antennas installed. When an IEEE 1609 device provides services, different services may be transmitted on different service channels for the transmission efficiency consideration or other factors. As specified by the aforementioned IEEE 1609 protocol, if the services required by a single-antenna device are distributed on two or more service channels, a service channel must be selected from the two or more service channels to transmit the service, and the rest service channels are given up.

Therefore, the exemplary embodiments explore several characteristics of the system to facilitate the IEEE 1609 devices to break through the restriction by the number of hardware antennas and allow a single-antenna device to use services provided by two or more service channels simultaneously. In the exemplary embodiments, the user is a single-antenna device intends to use service, and the service forwarder or service provider is the device that provides services and has at least an antenna.

Figure 1A:
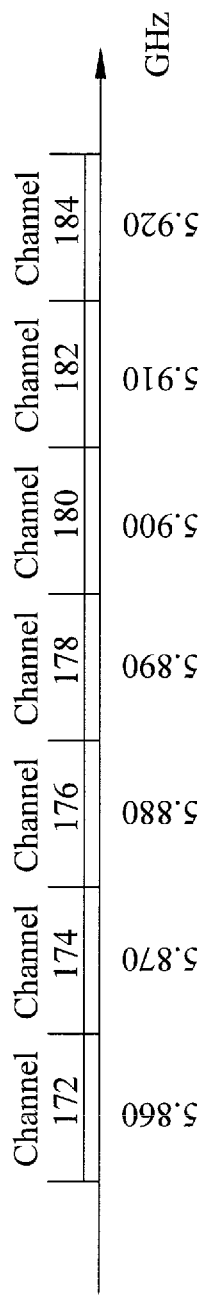
FIG. 1A shows an exemplary schematic view of the channel frequency allocation of IEEE 1609 protocol.
Figure 1B:
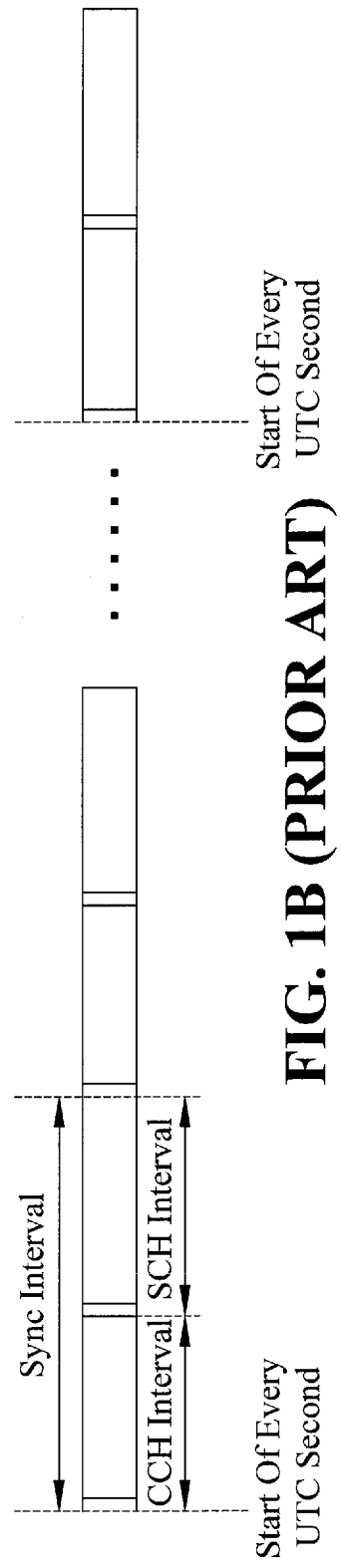
FIG. 1B shows an exemplary schematic view of the synchronous alternating and regular switching between control interval and service interval in IEEE 1609 protocol
Figure 2:
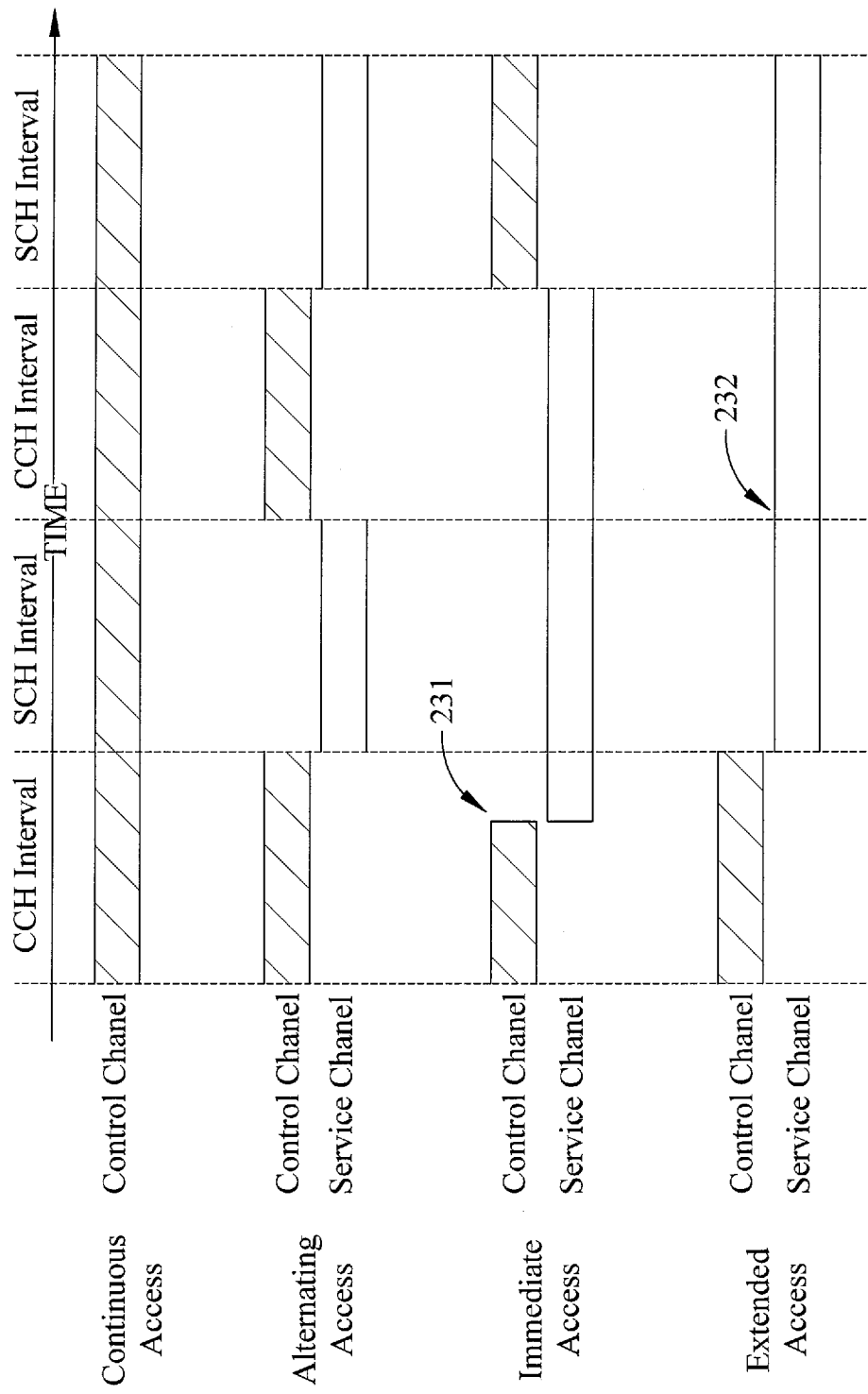
FIG. 2 shows an exemplary schematic view of four service channel access modes in IEEE 1609 protocol.
Figure 3:
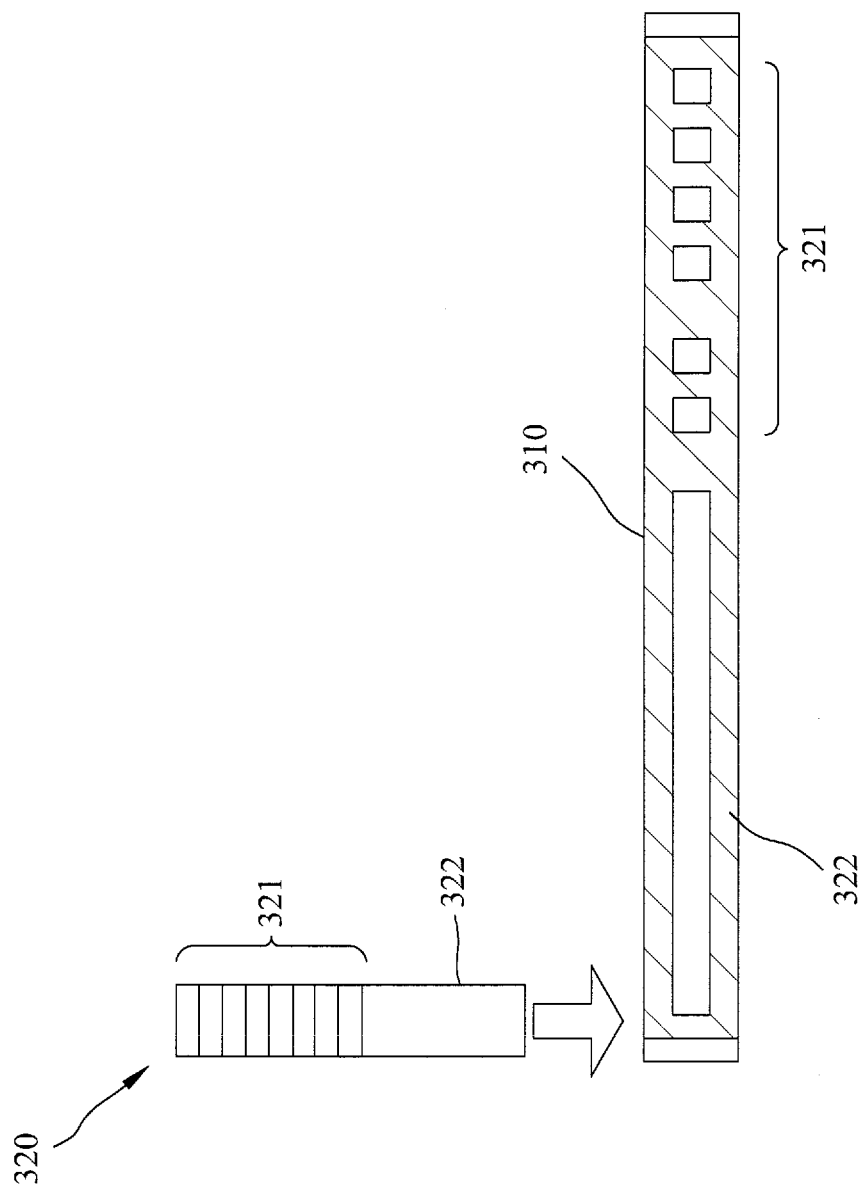
FIG. 3 shows an exemplary schematic view on how to use adaptive queuing order to improve the system channel utilization in discontinuous wireless channel.
Figure 4:
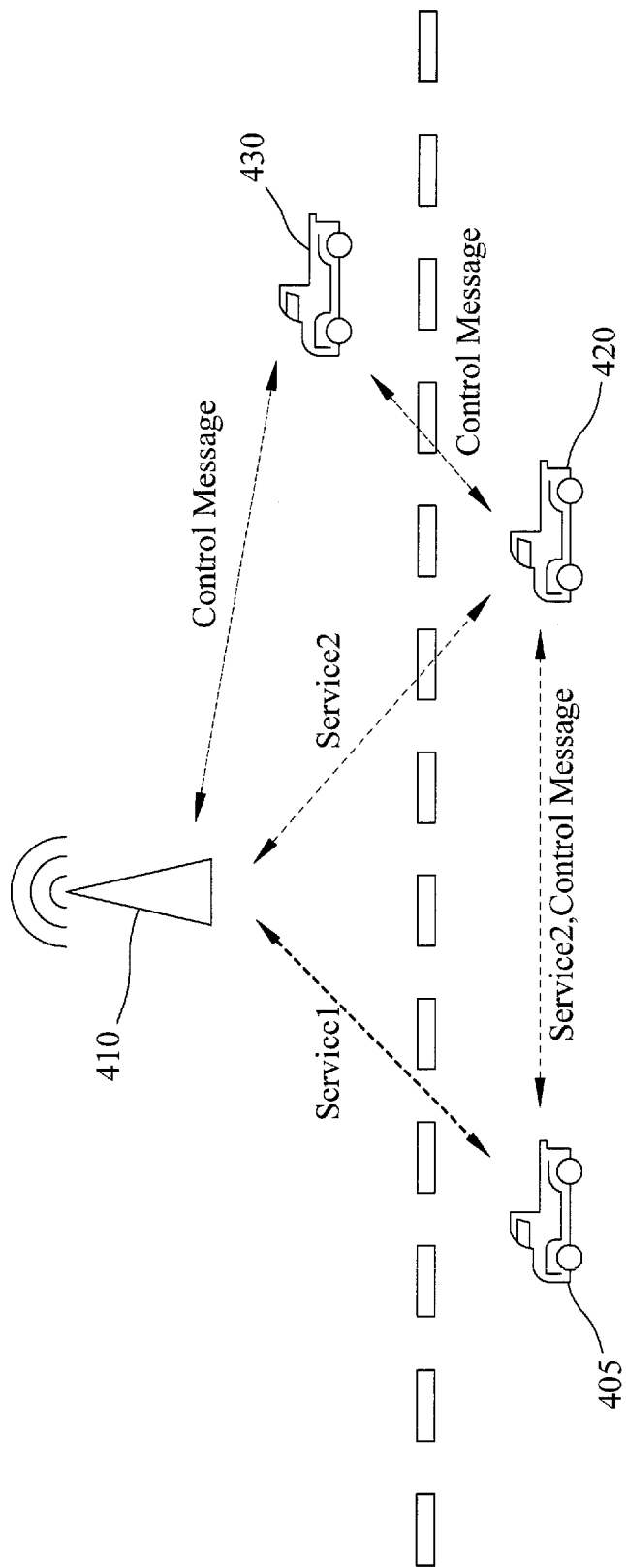
FIG. 4 shows an exemplary schematic view of a multichannel switching wireless environment, consistent with certain disclosed embodiments.

FIG. 4 shows an exemplary schematic view of a wireless alternating switching channel environment, consistent with certain disclosed embodiments. In wireless alternating switching channel environment 400, service provider 410 provides service 1 on service channel 1 and service 2 on service channel 2. Service forwarder 420 is using service 2. Service forwarder 430 is idling. User 405 intends to use services 1, 2. Therefore, user 405, service forwarder 420 and service forwarder 430 must coordinate to allow user 405 to use service 1 and service 2 simultaneously. User 405 may coordinate with service forwarder 420 through information exchange, such as, exchange information on service 2 and control message. Service forwarder 430 may alternate using control channel and service channel 2 and use service channel 2 to transmit the control message to service forwarder 420. Service forwarder 420 may extend the use of service channel 2 and selects the data required by service 2 to combine with received control message, and then transmit to user 405 through a specified forwarding channel.

Figure 5A:
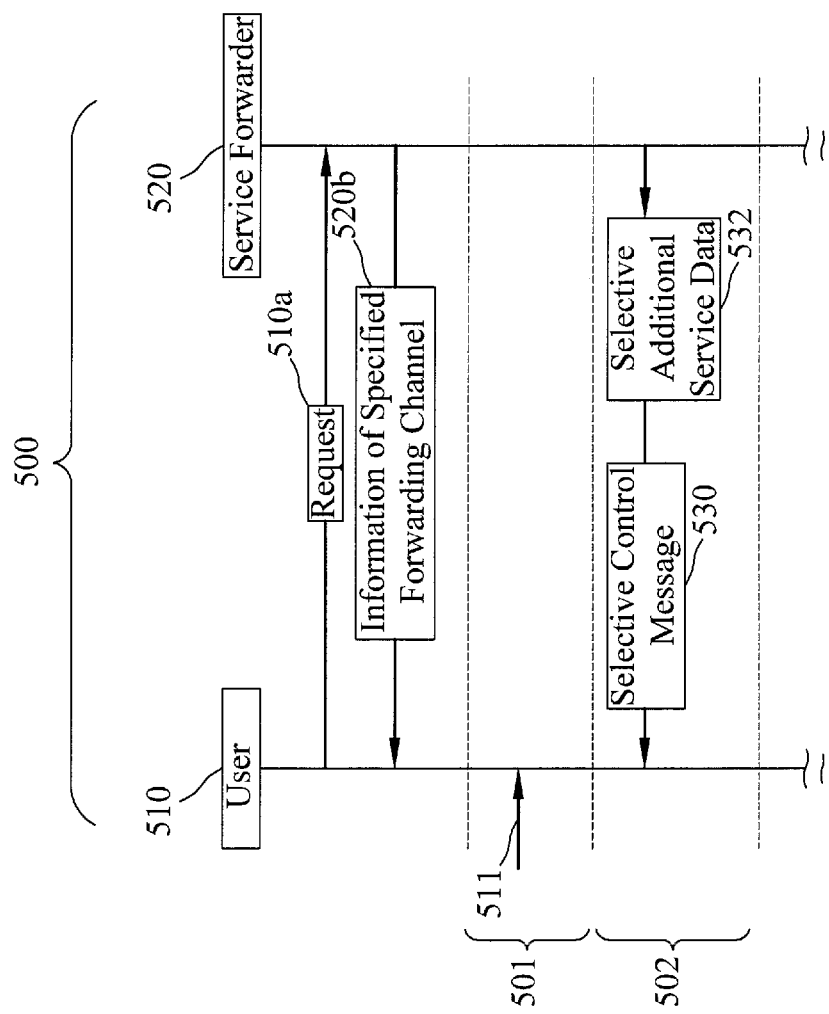
FIG. 5A shows an exemplary schematic view of a system for data transmission on wireless alternating switching channels, consistent with certain disclosed embodiments.

The technology for data transmission on wireless alternating switching channels of the exemplary embodiments is applicable to a multichannel switching wireless environment. FIG. 5A shows a schematic view of a system for data transmission on wireless alternating switching channels, consistent with certain disclosed embodiments. In the exemplary embodiment of FIG. 5A, data transmission system 500 may comprise a user 510 and a service forwarder 520. User 510 wants to use multiple services and service forwarder 520 may provide at least an additional service apart from the original service for the user.

User 510 sends a request 510*a* to service forwarder 520 to obtain at least an additional service and receives the response from service forwarder 520, including information of a specified forwarding channel 520*b*. Service forwarder 520 receives request 510*a* from user 510 and use a specified service channel used by the at least an additional service to transmit or receive the information of the additional service to the user and use the specified forwarding channel to transmit the selective control message and selective additional service information to user 510.

Before the connection between user 510 and service forwarder 520 ends or fails, during service interval 501, user 510 receives original service 511 originally used by user 510, and service forwarder 520 uses the specified service channel used by the additional service to transmit or receive the additional service information for user 510. During control interval 502, service forwarder 520 forwards at least a selective control message (SCM) 530 and selective additional service data 532 to user 510 and user 510 switches to specified forwarding channel to receive SCM 530 and selective additional service data.

Figure 5B:
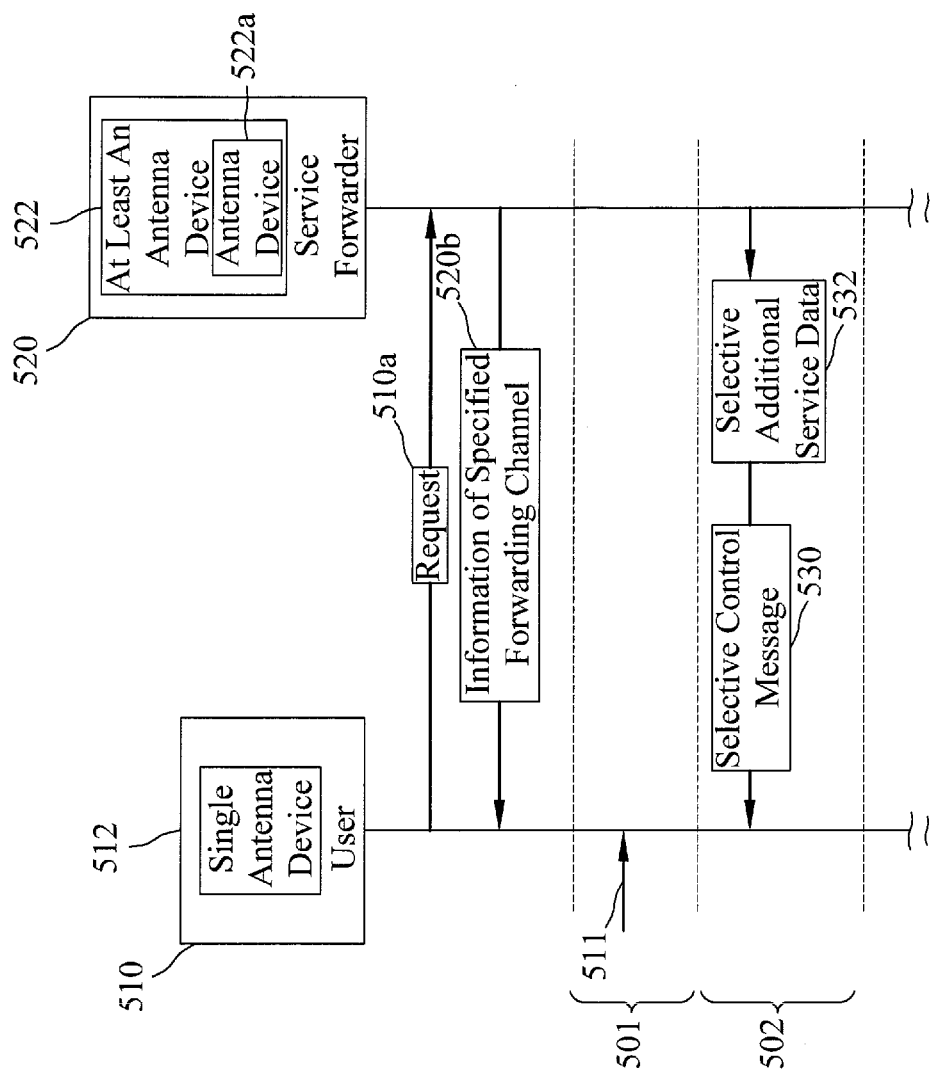
FIG. 5B shows an exemplary schematic view of using antenna device to execute wireless communication in the data transmission system of FIG. 5A, consistent with certain disclosed embodiments.

FIG. 5B shows an exemplary schematic view of the data transmission system of FIG. 5A using antenna device for wireless communication, consistent with certain disclosed embodiments. In FIG. 5B, user 510 may include a single antenna device 512 and service forwarder may include at least an antenna device 522. User 510 may use single antenna device 512 to send request 510*a*, receive original service of user 510 during service interval 501, and receive SCM 530 and selective service data 532 during control interval 502. Service forwarder 520 may use an antenna device 522*a* of at least antenna device 522 to use the specified service channel used by the additional service. During service interval 501, antenna device 522*a* transmits or receives additional service data for user 510, and during control interval 502, antenna device 522*a* transmits SCM 530 and selective service data 532 to user 510. The specified forwarding channel and the specified service channel used by the additional service may be the same service channel to reduce the complexity of the antenna switching.

In FIG. 5B, service forwarder 520 is a device to aid user 510 to receive or transmit the additional service provided by at least a service provider. For example, service forwarder 520 is the device using the service channel used by user 510 or not used by user 510. Service provider and service forwarder may be different devices or the same device. If service provider is different from the service forwarder, data transmission system 500 may further include the service provider according to the application.

Request 510*a* at least includes information of service information list the user wants to use, network card ID, and so on. Information of the specified forwarding channel 520*b* is the information of the specified forwarding channel that the service forwarder wants to use, such as, the information of the service channel of the additional service required by the service forwarder to transmit to the user. The specified forwarding channel is the channel negotiated by the user and the service forwarder. Selective additional service data 532 is the service data required by user 510 and other users, received by service forwarder 520 and then discarding the data not required by user 510. SCM 530 and selective additional service data 532 may include, such as, WSA and WSMP, such as, traffic wave short message.

Figure 6A:
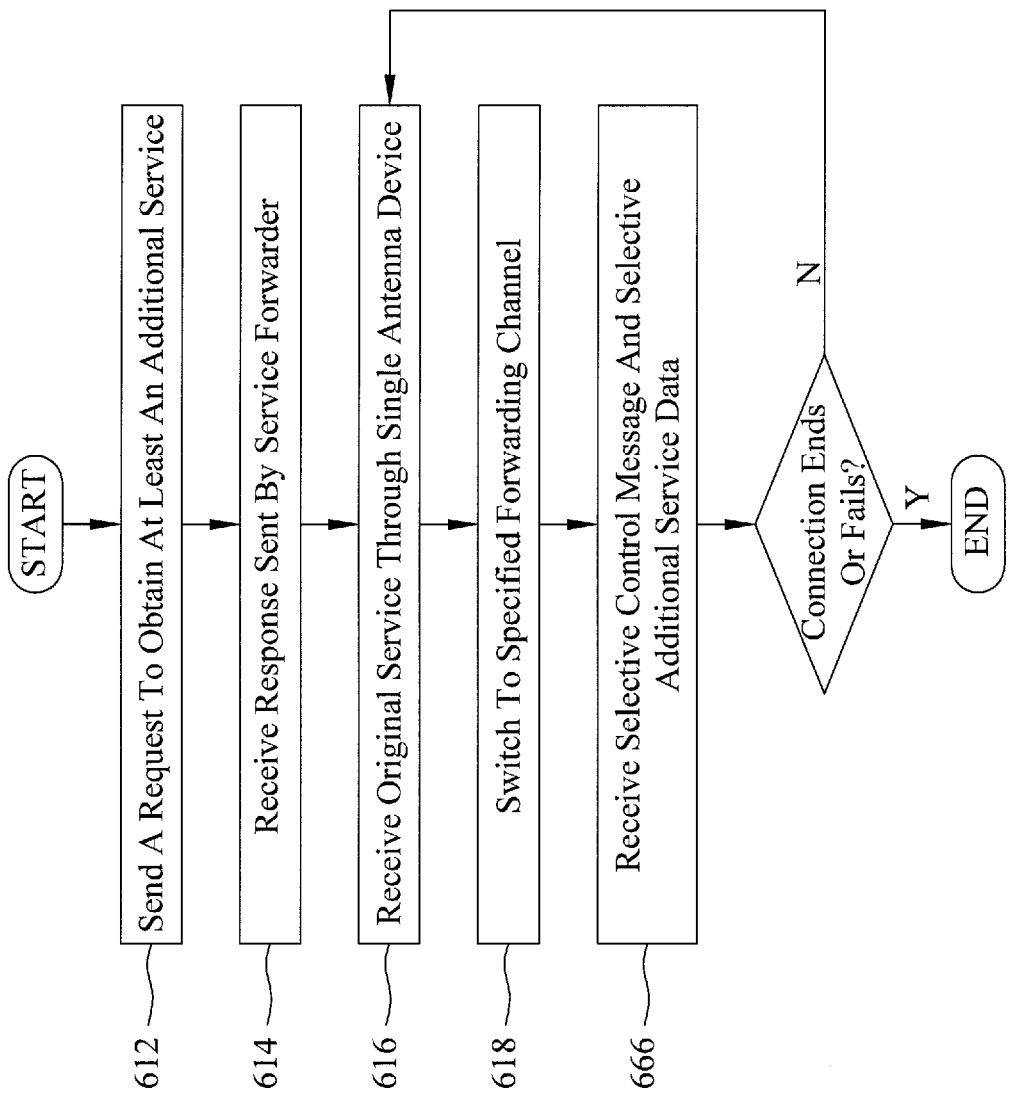
FIG. 6A shows an exemplary flowchart of the method for data transmission on wireless alternating switching channels, consistent with certain disclosed embodiments.
Figure 6B:
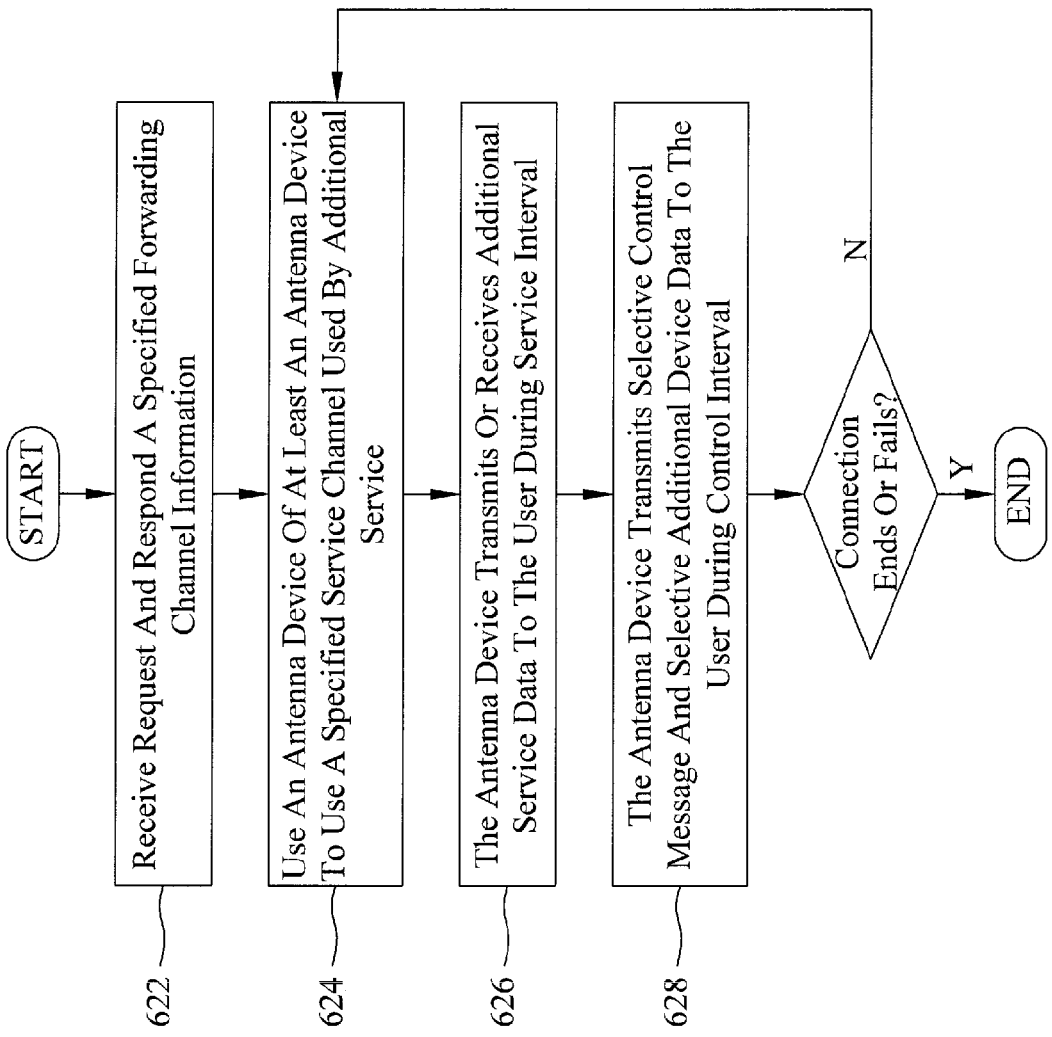
FIG. 6B shows an exemplary flowchart illustrating the operation of the service forwarder in the method for data transmission on wireless alternating switching channels, consistent with certain disclosed embodiments.

FIG. 6 shows an exemplary schematic view of the method for data transmission on wireless alternating switching channels, consistent with certain disclosed embodiments, where FIG. 6A is the exemplary flowchart of the user operation and FIG. 6B is the exemplary flowchart of the service forwarder operation. Refer to FIG. 6A and FIG. 6B simultaneously.

In step 612 of FIG. 6A, the user sends a request to obtain at least an additional service. The request sent by the user may notify the service forwarder of the information of service channel to be used, service to be used and required WSA. Correspondingly, in FIG. 6B, step 622 is for service forwarder to receive this request and respond a specified forwarding channel information to the user. In step 614 of FIG. 6A, the user receives the response from the service forwarder, including information of the specified forwarding channel. In other words, the user sends a request to obtain at least an additional service and receives the information of a specified forwarding channel sent by the service forwarder.

Before the connection between the user and the service forwarder ends or fails, during a service interval, the user may use a single antenna device to receive the original service, as shown in step 616 of FIG. 6A. Correspondingly, in step 624 of FIG. 6B, the service forwarder may use a specified service channel used by additional service through an antenna device of at least an antenna device, and also in step 626, this antenna device may transmit or receive additional service data for the user during the service interval. In other words, during a service interval, the user receives the original service used by the user and service forwarder extends the use of the service channel used by the additional service and transmits or receives the additional service data for the user. The specified forwarding channel is the service channel used by the additional used extendedly by the service forwarder.

During a control interval, the service forwarder may transmit or receive SCM and selective additional service data for the user through the antenna device, as shown in step 628 of FIG. 6B. Correspondingly, the user may switch to the specified forwarding channel, as shown in step 618 of FIG. 6A. In this manner, the user may receive the SCM and selective additional service data, as shown in step 666 of FIG. 6A. Hence, the user may use a single antenna device to use the services provided by two or more service channels simultaneously.

Following the above description, the following shows working examples of data transmission on wireless alternating switching channels with various initial channel conditions of multichannel switching wireless environments.

Figure 8:
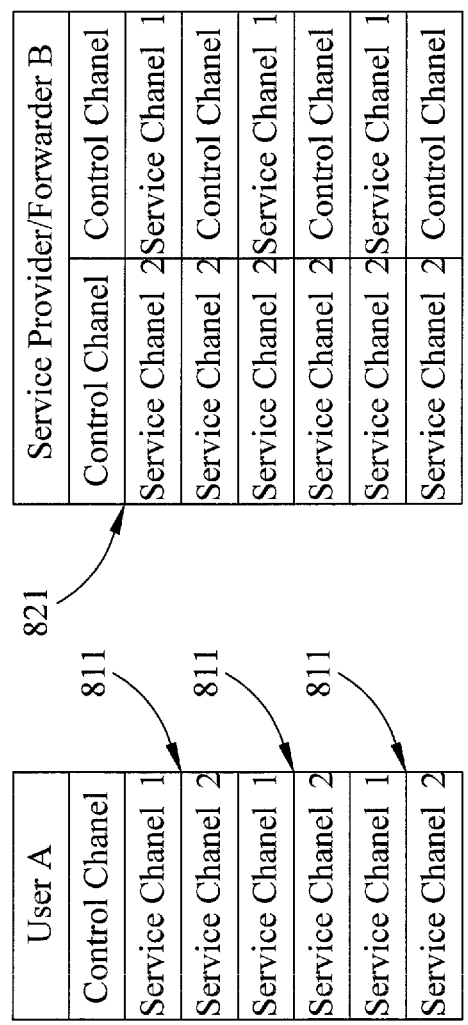
FIG. 8 shows an exemplary schematic view of the channel switching mode of the user and the service provider/forwarder for the first exemplar of FIG. 7, consistent with certain disclosed embodiments.
Figure 9:
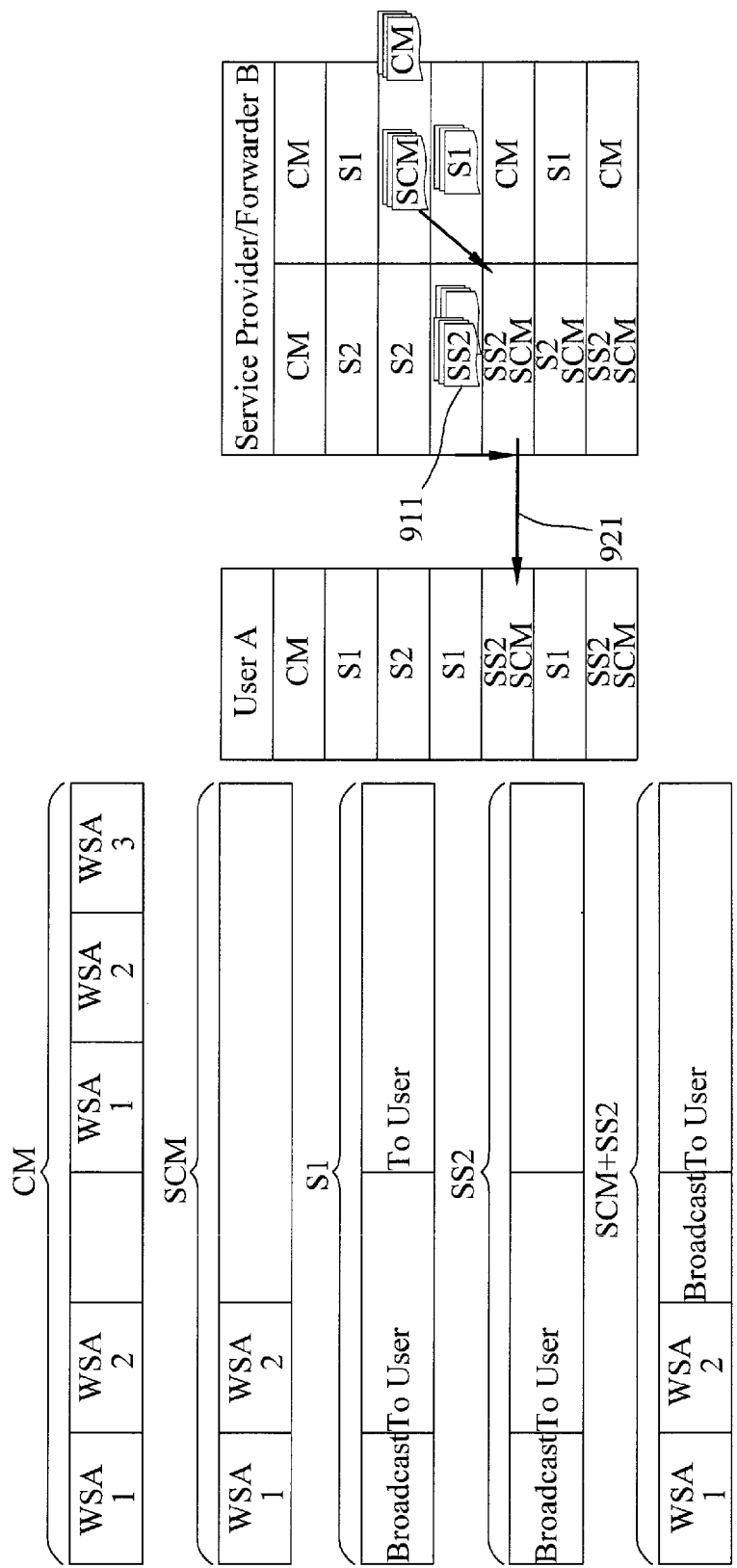
FIG. 9 shows an exemplary schematic view of the data exchange condition of the user and the service provider/forwarder for the first exemplar of FIG. 7, consistent with certain disclosed embodiments.

FIG. 7-FIG. 9 show a first exemplar describing the initial channel condition, channel switching mode and data exchange condition of the user, service provider and the service forwarder, respectively, consistent with certain disclosed embodiments. To simplify the description, the service provider and the service forwarder are the same device in the example. Assume that the initial channel condition of user A and service provider/forwarder B are shown in FIG. 7. Service provider/forwarder B has two antennas, providing service 1 and service 2 on service channel 1 and service channel 2, respectively. User A is a single antenna device intending to use these two services simultaneously.

FIG. 8 shows the channel switching mode of user A, service provider/forwarder B. When user A enters the service coverage of service provider/forwarder B, user A receives WSA issued by service provider/forwarder B on the control channel and knows that the two services are on service channel 1 and service channel 2, respectively. User A sends a request for multiple services to service provider/forwarder B on control channel, and transmits the related information of the service to be used, such as, service information list, network card ID, and so on, to service provider/forwarder B. As shown in FIG. 8, after service provider/forwarder B confirms that own device may meet the demands of user A, service provider/forwarder notifies user A of the specified forwarding channel (to reduce the complexity of antenna switching, channel 2 is selected in this exemplar), and switches the own first antenna to extended access mode, marked as arrow 821 and continue to stay in service channel 2. After user A learns of the specified forwarding channel, at the beginning of each control channel, user A uses the immediate access mode marked as arrow 811 to switch from service channel 1 to forward the specified forwarding channel, i.e., service channel 2.

FIG. 9 shows the data exchange condition of user A and service provider/forwarder B. After the communication starts, the second antenna of service provider/forwarder B uses alternating use mode to switch between the control channel and service channel 1. During the control interval, the second antenna receives and transmits control message CM, such as WSA1, WSA2, ..., WSA1, WSA2, WSA3, normally, and selectively keeps some control messages according to user A's requirements, called selective control message SCM, such as, WSA1, WSA2. During the service interval, the second antenna receives and transmits service data S1 required by service 1 normally, such as, broadcast, message unicast to user A, message unicast to user X. Because the first antenna uses extended access mode to stay on service channel 2, during the service interval, service provider/forwarder B receives and transmits service data S2 required by service 2 normally. In the mean time, according to the requirements of user A, service provider/forwarder B selectively keeps selective service data 2 (SS2) required by service 2, marked as 911.

During the control interval, service provider/forwarder B transmits the kept SCM by the second antenna and kept SS2 by the first antenna through the specified forwarding channel (service channel 2) to user A, marked as arrow 921. In this manner, according to the switching mode of FIG. 5, user A uses an immediate access mode at the beginning of each control channel to switch to specified forwarding channel to receive the data transmitted by service provider/forwarder B to achieve the simultaneous use of S1 of service 1 and SS2 of service 2 as well as receives the required SCM.

Figure 10:
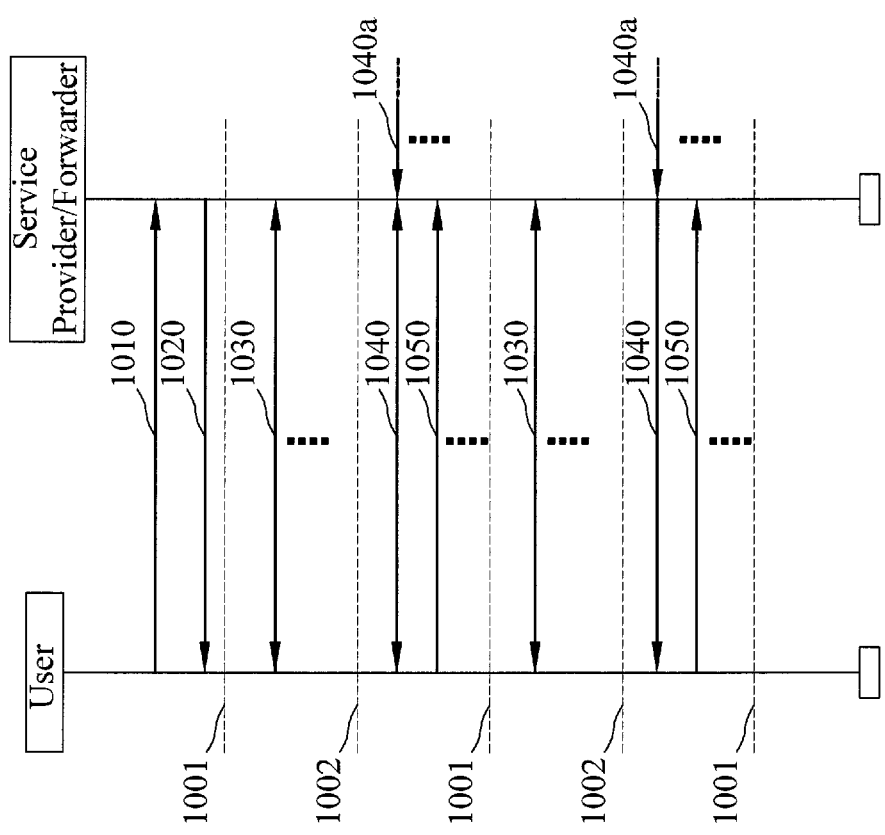
FIG. 10 shows an exemplary schematic view of the communication between the user and the service provider/forwarder during the service interval and the control interval for the first exemplar of FIG. 7, consistent with certain disclosed embodiments.

FIG. 10 shows the communication between the user and the service provider/forwarder during the service interval and the control interval in the first working exemplar, consistent with certain disclosed embodiments. Referring to FIG. 10, mark 1010 indicates that the user transmits information on the service channel to be used (e.g., channel number), service to be used (e.g., service ID) and required WSA (e.g., data rate, transmission power, MAC protocol address) to service provider/forwarder. Then, service provider/forwarder responds a request confirmation and transmits the information of a specified forwarding channel to the user, marked as 1020. At the beginning of each service interval 1001, the user and the service provider/forwarder execute WSMP communication, marked as 1030. Once the system is alternatingly switched to the beginning of control interval 1002, the service provider/forwarder uses wave short message to transmit selective WSA which is filtered from the original WSA 1040a and SS2 to the user, marked as 1040. When necessary, the user may use wave short message to return the data required by service 2, marked as 1050. In this manner, the process is alternatingly switching between the step marked 1030 of service interval and the steps marked 1040 and 1050 of control interval.

In other words, to use multiple services, the user needs to communicate with the device with at least an antenna (i.e., service forwarder) and inform the device with the at least an antenna of the service channel to be used, service to be used and WSA information. The device with the at least an antenna helps to receive and transmit the service provided on the service channel that the single antenna wants to use but is unable to monitor during the service interval. Based on the required information provided by the single antenna device, the unnecessary WSA not required by the single antenna device and service data not intended for this single antenna device are discarded, and the SCM and selective service data are transmitted through the agreed specified forwarding channel to the single antenna device during the control interval. In this manner, the single antenna device may use a multi-service channel.

Even if service 1 is not provided by service provider/forwarder or two independent devices are used to replace a service provider/forwarder B, the disclosed embodiments are also applicable, as shown in the following working exemplar.

FIG. 11 shows the initial channel condition of the second working exemplar. As shown in FIG. 11, service provider/forwarder B has two antennas, providing service 2 on service channel 2 and service 3 on service channel 3, respectively. User A is a single antenna device, already using service 1 provided by service provider C on service channel 1, and intending to use services 2, 3 provided by service provider/forwarder B.

Figure 12:
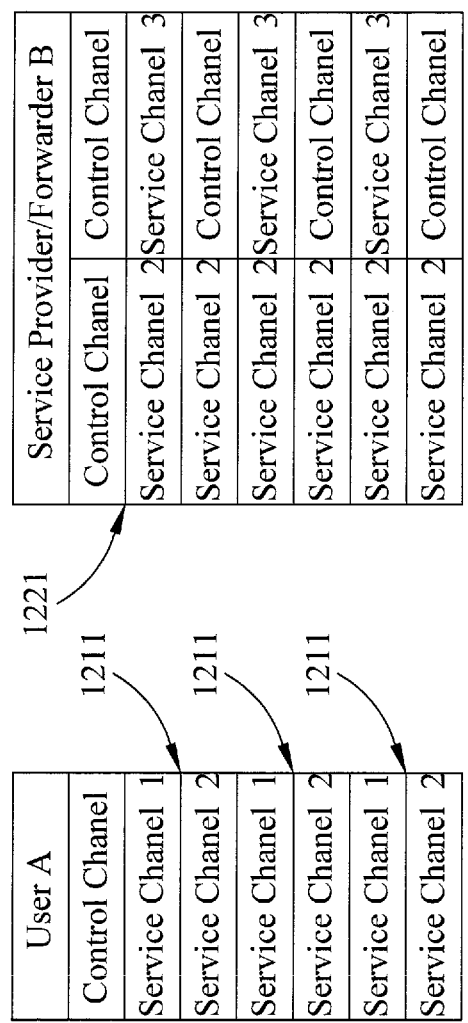
FIG. 12 shows an exemplary schematic view of the channel switching mode of the user and the service provider/forwarder for the second exemplar of FIG. 11, consistent with certain disclosed embodiments.

FIG. 12 shows an exemplary schematic view of the channel switching mode of the user and the service provider/forwarder for the second exemplar of FIG. 11, consistent with certain disclosed embodiments. Similar to the exemplar in FIG. 8, in the exemplar in FIG. 12, user A uses immediate access mode at the beginning of control channel, marked as arrow 1211, switching from service channel 1 to service channel 2. Service provider/forwarder B switches own first antenna to extended access mode, marked as arrow 1221, to continue staying in service channel 2.

Figure 13:
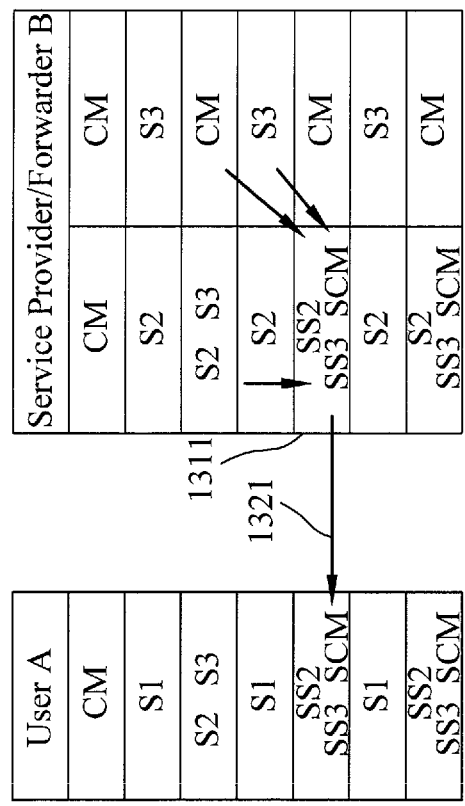
FIG. 13 shows an exemplary schematic view of the data exchange condition of the user and the service provider/forwarder for the second exemplar of FIG. 11, consistent with certain disclosed embodiments.

FIG. 13 shows an exemplary schematic view of the data exchange condition of the user and the service provider/forwarder for the second exemplar of FIG. 11, consistent with certain disclosed embodiments. The difference between FIG. 13 and FIG. 9 is that, during the service interval, service provider/forwarder B receives and transmits S2 required by service 2 and S3 required by service 3 normally. In the mean time, according to the demands of user A, service provider/forwarder selectively keeps SS2 required by service 2 and SS3 required by service 3, marked as 1311. During the control interval, service provider/forwarder B transmits the kept SCM by the second antenna and kept SS2 and SS3 by the first antenna through a specified forwarding channel (service channel 2) to user A, marked as 1321. In this manner, user A, based on FIG. 9, uses an immediate access mode at each beginning of control channel to switch to the specified forwarding channel to receive the data transmitted by service provider/forwarder B to achieve the receiving and transmitting of S1, SS2, SS3 at the same time as well as receiving necessary SCM.

Figure 14:
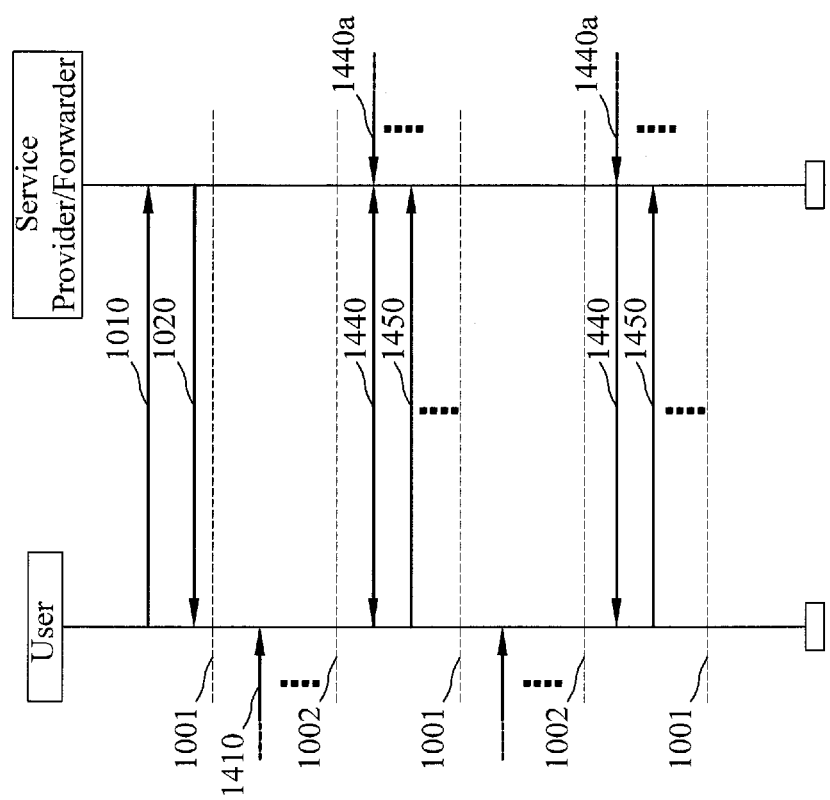
FIG. 14 shows an exemplary schematic view of the communication between the user and the service provider/forwarder during the service interval and the control interval for the second exemplar of FIG. 11, consistent with certain disclosed embodiments.

FIG. 14 shows an exemplary schematic view of the communication between the user and the service provider/forwarder during the service interval and the control interval for the second exemplar of FIG. 11, consistent with certain disclosed embodiments. The difference between FIG. 14 and FIG. 10 is that, before the service interval, the user has already used service 1 provided by another service provider C on service channel 1, marked as 1410. Therefore, during the service interval, the user and the current service provider/forwarder (i.e., B) do not execute WSMP communication. Once the control interval starts, service provider/forwarder B transmits selective WSA, data of selective service 2 and service 3 through wave short message to the user, marked as 1440. When necessary, the user may return data required by service 2 and service 3 through wave short message, marked as 1450. In this manner, the process is alternating switching between the step of no wave short message communication of service interval and steps marked as 1440, 1450 of control interval. Hence, the user may use the services (2, 3) provided by service provider/forwarder B.

From the above description, even if service 1 is not provided by service provider/forwarder B, user A may still use services 1, 2, and 3 at the same time.

Figure 15:
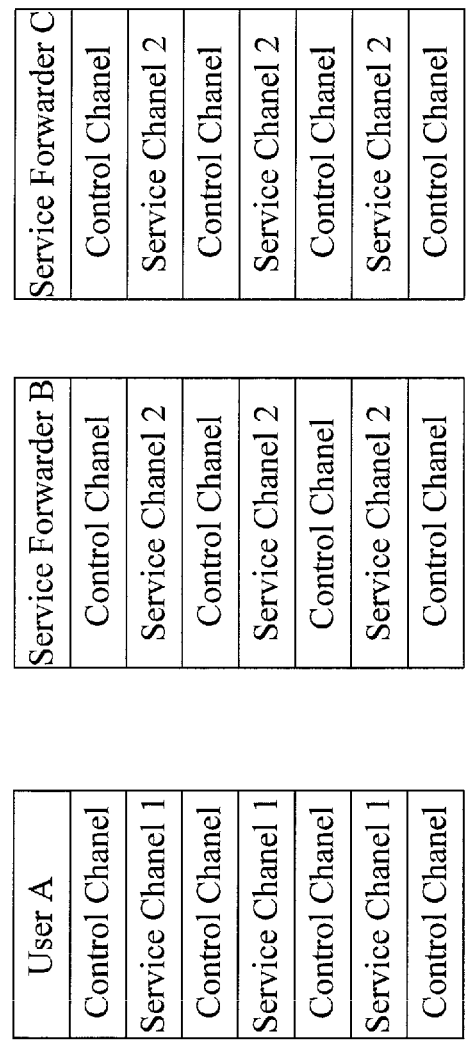
FIG. 15 shows an exemplary third working exemplar, describing the initial channel condition of the user and the service provider/forwarder, consistent with certain disclosed embodiments.

FIG. 15 shows the initial channel condition of the third working exemplar. In this working exemplar, a service provider (not shown) provides two additional services, i.e., service 1 on service channel 1 and service 2 on service channel 2. User A is a single antenna device and intends to use services 1, 2 provided by the service provider, where service forwarder B and service forwarder C are both idle or already using service 2. This exemplar may be viewed as coordination among three vehicles.

Figure 16:
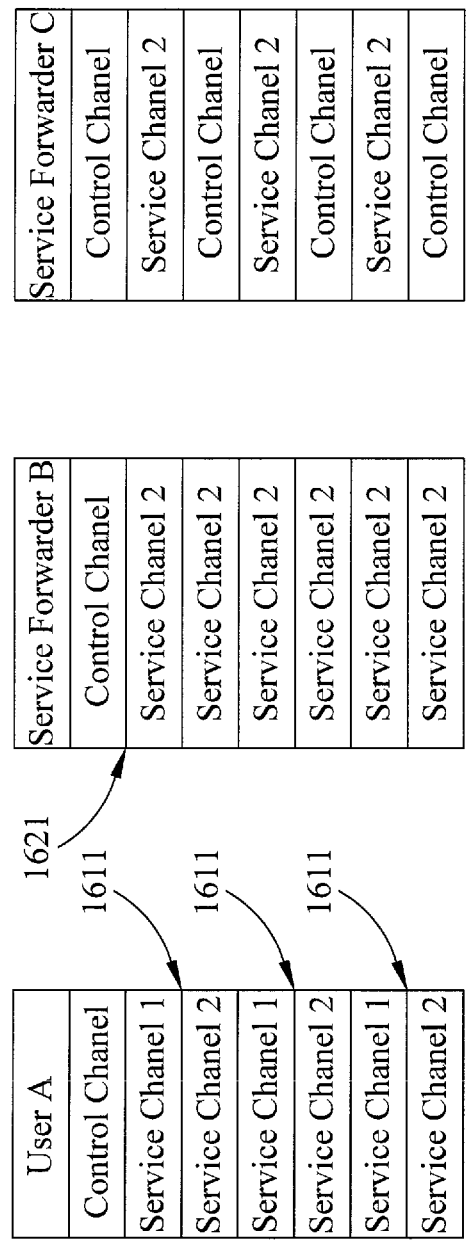
FIG. 16 shows an exemplary schematic view of the channel switching mode of the user and the service provider/forwarder for the third exemplar of FIG. 15, consistent with certain disclosed embodiments.

FIG. 16 shows an exemplary schematic view of the channel switching mode of the user and the service provider/forwarder for the third exemplar of FIG. 15, consistent with certain disclosed embodiments. Similar to the exemplar of FIG. 8, in the exemplar of FIG. 16, user A uses immediate access mode at the beginning of control channel, marked as 1611, switching from service channel 1 to service channel 2. Service forwarder B switches an own antenna to extended access mode, marked as 1621, to continue staying in service channel 2.

Figure 17:
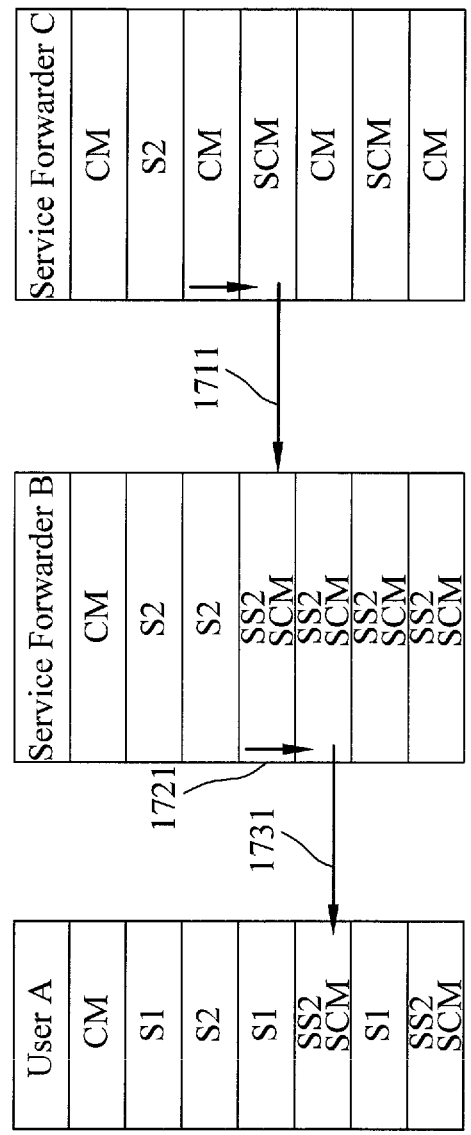
FIG. 17 shows an exemplary schematic view of the data exchange condition of the user and the service provider/forwarder for the third exemplar of FIG. 15, consistent with certain disclosed embodiments.

FIG. 17 shows an exemplary schematic view of the data exchange condition of the user and the service provider/forwarder for the third exemplar of FIG. 15, consistent with certain disclosed embodiments. During the service interval, service forwarder B receives and transmits S2 required by service 2 normally and service forwarder C transmits SCM through service channel 2 to service forwarder B, marked as 1711. Then, service forwarder B combines SCM and SS2, marked as 1721. Service forwarder B then transmits the combined SCM and SS2 through the specified forwarding channel to user A, marked as 1731. In this manner, user A, based on FIG. 9, uses an immediate access mode at each beginning of control channel to switch to the specified forwarding channel to receive the data transmitted by service forwarder B to achieve the receiving and transmitting of S1, SS2 at the same time as well as receiving necessary SCM.

Figure 18:
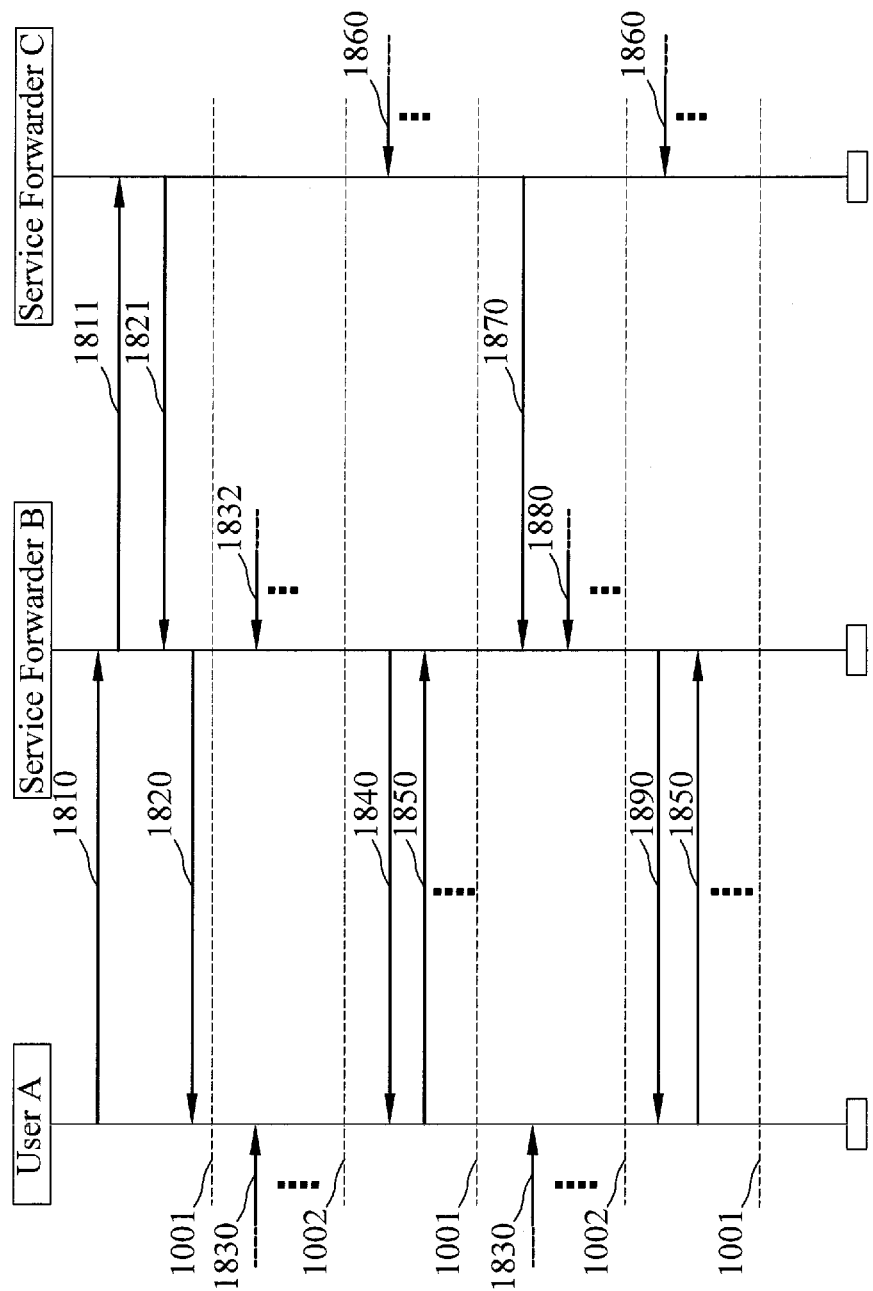
FIG. 18 shows an exemplary schematic view of the communication between the user and the service provider/forwarder during the service interval and the control interval for the third exemplar of FIG. 15, consistent with certain disclosed embodiments.

FIG. 18 shows an exemplary schematic view of the communication between the user and the service provider/forwarder during the service interval and the control interval for the third exemplar of FIG. 15, consistent with certain disclosed embodiments. Before the service interval, the user sends information of the service channel to be used, service to be used and required WSA to service forwarder B, marked as 1810. Then, marked as 1811, service forwarder B transmits the information of the service channel to be used, service to be used and required WSA to service forwarder C. Then, service forwarder C responds with a request confirmation and transmits the information of a specified forwarding channel to service forwarder B, marked as 1821. Finally, service forwarder B responds with a request confirmation and transmits the information of the specified forwarding channel to user A, marked as 1820.

Once a service interval starts, service 1 provider (not shown) transmits service 1 wave short message to user A, marked as 1830. Service forwarder B and service 2 provider (not shown) start to execute wave short message communication, marked as 1832. Once a control interval starts, service forwarder B transmits s data of selective service 2 through wave short message to user A, marked as 1840. When necessary, user A can return data required by service 2 through wave short message, marked as 1850. Service forwarder C receives WSA from other service providers (not shown), marked as 1860.

When another service interval starts, service 1 provider transmits wave short message of service 1 to user A, and service forwarder C transmits selective WSA targeting user A and service forwarder B to service forwarder B, marked as 1870. Service forwarder B and service 2 provider execute wave short message communication, marked as 1880.

When another control interval starts, service forwarder B transmits selective service 2 data and selective WSA targeting user A to user A, marked as 1890. When necessary, user A may return data required by service 2 through wave short message to service forwarder B and service forwarder C receives WSA from other service providers. In this manner, the process is alternating switching between the step of service interval and steps of control interval.

From the above description, user A, service forwarder B and service provider C may coordinate so that user A can use services 1 and 2 at the same time.

In another exemplary embodiment, an apparatus for data transmission on wireless alternating switching channels may be provided. The data transmission apparatus may comprise at least a service forwarder to forward at least an additional service to a user, where the coordination and operation of the user and the service forwarder is the same as the previous exemplary embodiments. For example, before the connection between the user and the at least a service forwarder ends or fails, the coordination and operation of during the service interval or the control interval, the specified forwarding channel is a service channel coordinated between the user and the at least a service forwarder, and so on. The details will not be repeated here.

In summary, the disclosed exemplary embodiments may provide a system, method and apparatus for data transmission on wireless alternating switching channels, applicable to a multichannel switching wireless environment. The exemplary embodiments may overcome the restriction of the number of the hardware antennas so that the device intending to use the service may use the additional services on a plurality of service channels and improve the channel utilization as well as increases the available services to the device.

Although the present invention has been described with reference to the disclosed exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A system for data transmission on wireless alternating switching channels, comprising:

at least a service forwarder for forwarding at least an additional service to a user sending a request to obtain said at least an additional service and to notify said at least a service forwarder to switch to a specified forwarding channel for exchanging information related to said at least an additional service and to receive information of said specified forwarding channel, and responding with information of said specified forwarding channel to said user;

wherein said user sends a request to said at least a service forwarder to obtain said at least an additional service, and receives information of a specified forwarding channel responded by said at least a service forwarder;

wherein before a connection between said user and said at least a service forwarder ends or fails, during a service interval, said user receives at least an original service and said at least a service forwarder uses a specified service channel used by said at least an additional service to receive or transmit data of said at least an additional service to said user;

while during a control interval, said at least a service forwarder uses said specified forwarding channel to transmit at least a selective control message and selective additional service data selected by said at least a service forwarder for said at least an additional service to said user, said user switches to said specified forwarding channel to receive said at least a selective control message and said selective additional service data.

2. The system as claimed in claim 1, wherein said at least a service forwarder is a device either currently using an additional service channel said user wants to use or not using any service channel.

3. The system as claimed in claim 1, wherein information of said specified forwarding channel at least includes information of said at least a specified forwarding channel that said at least a service forwarder wants to use.

4. The system as claimed in claim 3, wherein said specified forwarding channel is a service channel coordinated by said user and said at least a service forwarder.

5. The system as claimed in claim 1, wherein said request at least includes at least a service information list said user wants to use and information of at least a network card number.

6. The system as claimed in claim 1, wherein said selective additional service data is the data required by said user and other users and received by said at least a service forwarder, and then the data not required by said user is discarded.

7. The system as claimed in claim 1, wherein said at least a selective control message and selective additional service data at least include at least a wave service advertisement (WSA) and at least a wave short message.

8. The system as claimed in claim 1, wherein said user has a single antenna device and uses said single antenna device to send said request, receive at least an original service for said user and receive said at least a selective control message and said selective additional service data.

9. The system as claimed in claim 1, wherein said at least a service forwarder has at least an antenna, and an antenna device of said at least an antenna uses said specified service channel used by said at least an additional service to transmit or receive additional service data for said user and transmit said at least a selective control message and said selective additional service data.

10. The system as claimed in claim 1, wherein said at least a service forwarder is a device having at least an antenna.

11. A method for data transmission on wireless alternating switching channels, comprising:

an user sending a request to obtain at least an additional service and to notify at least a service forwarder to switch to a specified forwarding channel for exchanging information related to said at least an additional service and to receive information of said specified forwarding channel, and receiving information of said specified forwarding channel responded by said at least a service forwarder; and before the connection between said user and said at least a service forwarder ending or failing, alternating switching to execute operations during a service interval and operations during a control intervals;

wherein during said service interval, said user receives at least an original service and said at least a service forwarder uses a specified service channel used by said at least an additional service to receive or transmit data of said at least an additional service to said user; and during said control interval, said at least a service forwarder uses said specified forwarding channel to transmit at least a selective control message and selective additional service data selected by said at least a service forwarder for said at least an additional service to said user, said user switches to said specified forwarding channel to receive said at least a selective control message and said selective additional service data.

12. The method as claimed in claim 11, said method is applied in a multichannel switching wireless environment.

13. The method as claimed in claim 12, wherein in said request sent by said user, said user informs said service forwarder of at least a service channel that said user wants to use, at least a service said user wants to use and required Wireless Access Vehicular Environments Service Advertisement information.

14. The method as claimed in claim 11, wherein said user uses a single antenna device to send said request, receive said at least an original service for said user, and receive said at least a selective control message and said selective additional service data.

15. The method as claimed in claim 14, wherein during said service interval, based on requirement information provided by said single antenna device, said at least a service forwarder discards in advance Wireless Access Vehicular Environments Service Advertisement not required by said single antenna device and service data not for said single antenna device, and then transmits said selective service data through said specified forwarding channel during said control interval to said single antenna device.

16. The method as claimed in claim 11, wherein said at least a service forwarder uses an antenna device of said at least an antenna to use said specified service channel used by said at least an additional service to transmit or receive additional service data for said user and transmit said at least a selective control message and said selective additional service data.

17. The method as claimed in claim 16, wherein said at least a selective control message and said selective additional service data at least includes at least a Wireless Access Vehicular Environments Service Advertisement and at least a wave short message.

18. The method as claimed in claim 11, wherein said user uses an immediate access mode to switch to said specified forwarding channel at the beginning of every control interval.

19. An apparatus for data transmission on wireless alternating switching channels, comprising:

at least a service forwarder for forwarding at least an additional service to a user;

wherein said user sends a request to said at least a service forwarder to obtain said at least an additional service and to notify said at least a service forwarder to switch to a specified forwarding channel for exchanging information related to said at least an additional service and to receive information of said specified forwarding channel, and receives information of said specified forwarding channel responded by said at least a service forwarder;

before the connection between said user and said at least a service forwarder ends or fails, during a service interval, said user receives at least an original service and said at least a service forwarder uses a specified service channel used by said at least an additional service to receive or transmit data of said at least an additional service to said user;

during a control interval, said at least a service forwarder uses said specified forwarding channel to transmit at least a selective control message and selective additional service data selected by said at least a service forwarder for said at least an additional service to said user, said user switches to said specified forwarding channel to receive said at least a selective control message and said selective additional service data.

20. The apparatus as claimed in claim 19, wherein said at least a service forwarder is a device either currently using an additional service channel said user wants to use or not using any service channel.

21. The apparatus as claimed in claim 19, wherein said at least a service forwarder has at least an antenna, and an antenna device of said at least an antenna uses said specified service channel used by said at least an additional service to transmit or receive additional service data for said user and transmit said at least a selective control message and said selective additional service data.

22. The apparatus as claimed in claim 19, wherein said selective additional service data is the data required by said user and other users and received by said at least a service forwarder, and then the data not required by said user is discarded.

23. The apparatus as claimed in claim 19, wherein said specified forwarding channel is a service channel coordinated by said user and said at least a service forwarder.

24. The apparatus as claimed in claim 19, wherein said at least a service forwarder is a device having at least an antenna.

* * * * *